US006512177B2

(12) United States Patent
Kosuge

(10) Patent No.: US 6,512,177 B2
(45) Date of Patent: Jan. 28, 2003

(54) PROTECTION COVER FOR A BATTERY TERMINAL AND A BATTERY TERMINAL

(75) Inventor: Shuji Kosuge, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 16 days.

(21) Appl. No.: 09/880,547

(22) Filed: Jun. 13, 2001

(65) Prior Publication Data

US 2002/0050382 A1 May 2, 2002

(30) Foreign Application Priority Data

Jun. 19, 2000 (JP) ....................................... 2000-183106

(51) Int. Cl.[7] .................................................. H02G 3/14

(52) U.S. Cl. ........................... 174/66; 174/67; 174/135; 174/138 F; 220/241; 220/242; 439/522

(58) Field of Search ......................... 174/66, 67, 138 F, 174/91, 92, 135, 188, 190; 439/135, 142, 149, 521, 522, 901, 904; 220/241, 242; D8/353

(56) References Cited

U.S. PATENT DOCUMENTS 5,346,407 A 9/1994 Hood
5,399,103 A 3/1995 Kuboshima et al.
5,576,516 A 11/1996 Kameyama et al.
6,037,542 A * 3/2000 McCall ........................ 174/66
6,090,502 A * 7/2000 Ingram et al. ........... 174/138 F
6,153,329 A * 11/2000 Raschilla et al. ....... 439/522 X
6,160,220 A * 12/2000 Takimura ..................... 174/66
6,172,302 B1 * 1/2001 Kasai ..................... 220/242 X
6,417,450 B1 * 7/2002 Young ......................... 174/66

* cited by examiner

*Primary Examiner*—Anthony Dinkins
*Assistant Examiner*—Dhiru R Patel
(74) *Attorney, Agent, or Firm*—Anthony J. Casella; Gerald E. Hespos

(57) ABSTRACT

A protection cover includes a lid (32) and a cover (37) which have interfering portions (36, 41), which do not interfere with each other while the cover (37) is being displaced from an exposing position to a protecting position, if the lid (32) is mounted properly in a closing position with respect to the accommodating portion (22). However the interfering portions (36, 41) interfere to prevent the cover (37) from reaching the proper closing position when the lid (32) is mounted improperly. Thus, whether the lid (32) is mounted properly on the accommodating portion (22) can be detected based on whether or not the interfering portions (36, 41) interfere with each other while the cover (37) is being displaced to the pretecting position.

14 Claims, 10 Drawing Sheets

PROTECTION COVER FOR A BATTERY TERMINAL AND A BATTERY TERMINAL

BACKGROUND OF THE INVENTION

1. Field of the Invention

The invention relates to a protection cover for a battery terminal and to a battery terminal with such protection cover.

2. Description of the Related Art

A battery terminal has a clamp connectable with a battery post and a wire connector connected with the clamp. A known protection cover for such a battery terminal is disclosed in U.S. Pat. No. 5,576,516. The protection cover comprises a tubular portion that surrounds the wire connector over its entire circumference and a cover for covering upper and lateral sides of the clamp. The tubular portion includes an accommodating portion that is open to accommodate the wire connector in a direction normal to its longitudinal axis. The tubular portion also has a lid that can be displaced to open or close the accommodating portion. The cover also can be displaced to expose or cover the clamp.

The tubular portion that surrounds the wire connector can accommodate the wire with improved operability by adopting a split construction of the accommodating portion and the lid portion. However, if the lid is not completely mounted on the accommodating portion, external matter may enter the surrounding portion through a clearance between the accommodating portion and the lid to contact the wire connector.

In view of the above, an object of the invention is to provide a battery terminal cover with a surrounding portion that has an accommodating portion and a lid, and with an ability to detect whether the lid is mounted securely on the accommodating portion.

SUMMARY OF THE INVENTION

The invention is directed to a protection cover that can be mounted on a battery terminal that has a clamp for connection with a battery post and a wire connector for connection with a wire. The protection cover comprises a tubular surrounding portion for substantially surrounding the wire connector. The surrounding portion comprise an accommodating portion to at least partly accommodate the wire connector, and a lid which is displaceable between an open position spaced from an opening of the accommodating portion and a closed position where the lid substantially closes the opening.

The protection cover also comprises a cover for substantially covering upper and lateral sides of the clamp. The cover is displaceable between an exposing position where the cover exposes the clamp and a protecting position where the cover substantially covers the clamp.

The lid and the cover have interfering portions. The interfering portions do not interfere with each other while the cover is being displaced from the exposing position to the protecting position if the lid is mounted properly in the closing position with respect to the accommodating portion. However, the interfering portions do interfere with each other if the lid is mounted improperly, and hence the cover cannot reach the proper closing position. As a result, proper mounting of the lid on the accommodating portion can be detected based on whether the interfering portions interfere with each other while the cover is being displaced to the protecting position.

The wire connector preferably is inserted into the accommodating portion in a direction substantially normal to its longitudinal axis.

The cover may be supported on the accommodating portion for rotation parallel to a side wall of the cover. Additionally, the lid may be mounted for rotation on the accommodating portion and may reach the closing position by rotating across a rotation path of the side wall of the cover from an exposing position to a closing position.

The side wall of the cover interferes with the lid when the cover is rotated with the lid improperly mounted. However, the side wall of the cover is located outside the lid and restricts an outward displacement of the lid toward the opening position when the lid is mounted in the proper closing position and the cover is in the protecting position.

The interfering portion of the cover in the exposing position and the interfering portion of the lid in the closing position are located adjacent or proximate to each other. Displacement of the cover from the exposing position toward the protecting position causes the interfering portions to interfere with each other immediately after the displacement of the cover is started if the lid is improperly mounted. Thus, the cover need not be rotated a large amount.

The lid may be supported for rotation on the accommodating portion and the interfering portion may be at an end of the lid opposite the center of rotation. Thus, the shift of the interfering portion between the improperly and the properly mounted states of the lid is larger. Accordingly, the interfering portion of the lid can securely contact the interfering portion of the cover when the lid is mounted improperly.

The lid and the cover may have position correcting portions that engage each other during the displacement of the cover to the protecting position to forcibly push the improperly mounted lid to the proper closing position.

The invention also is directed to a battery terminal comprising a clamp to be connected with a battery post, a wire connector to be connected with a wire and a protection cover as described above.

These and other objects, features and advantages of the present invention will become apparent upon reading of the following detailed description of preferred embodiments and accompanying drawings.

DETAILED DESCRIPTION OF THE PREFERRED EMBODIMENT

Figure 1:
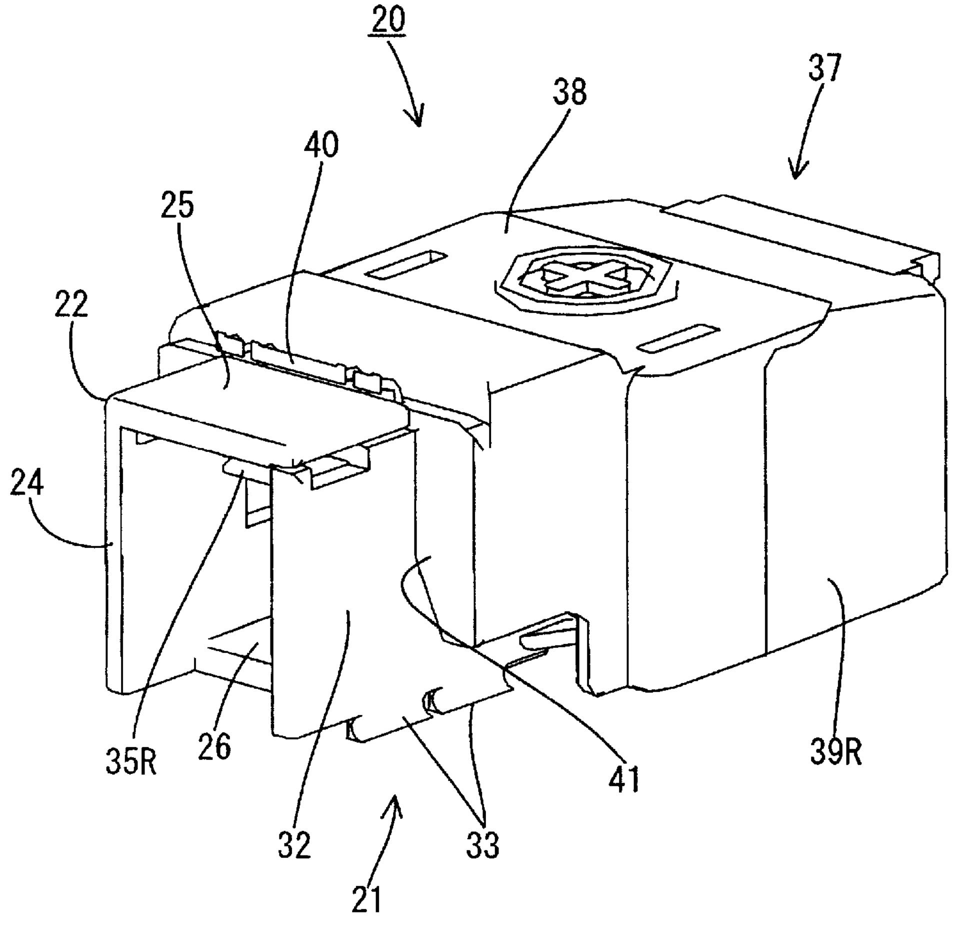
FIG. 1 is a perspective view of a protection cover according to one embodiment of the invention.
Figure 2:
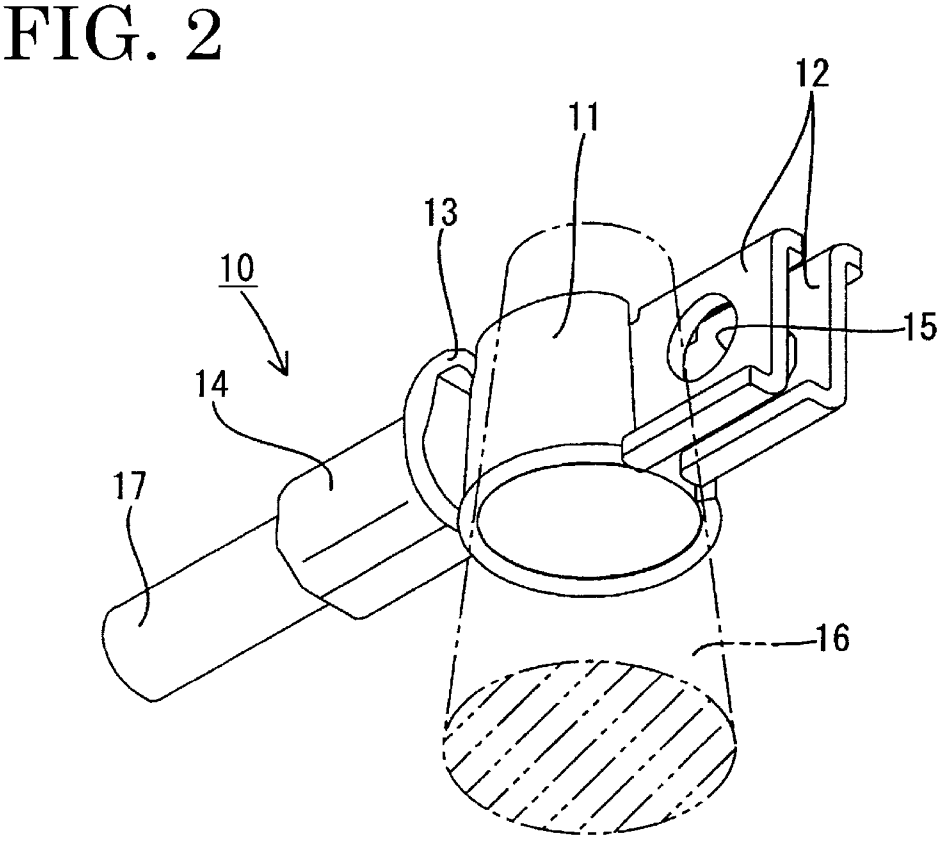
FIG. 2 is a perspective view of a battery terminal.

The protection cover of the subject invention is used with a battery terminal 10, as shown in FIG. 2. The battery terminal 10 has a substantially arcuate clamp 11 formed by bending a conductive metallic plate to a specified shape with a vertically extending longitudinal axis. The clamp 11 also has left and right fastening plates 12 that extend forward from the opposite circumferential ends of the clamp 11. A wire connector 14 extends backward from the clamp 11 via a coupling portion 13. The clamp 11 preferably is tapered toward its upper end, and can have its diameter reduced by inserting a bolt (not shown), through bolt holes 15 formed in the two fastening plates 12 and bringing the two fastening plates 12 closer to each other with a nut (not shown) that is engaged with a portion of the bolt that projects from the bolt holes 15. In this way, the clamp 11 can be fastened to the outer circumferential surface of a battery post 16 for electrically connecting the battery terminal 10 and the battery post 16. Further, an end of a wire 17 is connected with the wire connector 14 by crimping, folding or bending crimping the wire connector 14.

The protection cover 20 to be mounted on the battery terminal 10 is made of a synthetic resin material, and comprises a rear end with a substantially rectangular tubular surrounding portion 21 for substantially surrounding the wire connector 14 of the battery terminal 10. The protection cover 20 also comprises a front end with a cover 37 for substantially covering the upper, front and opposite lateral sides of the clamp 11 and the fastening plates 12.

The surrounding portion 21 comprises an accommodating portion 22 and a lid 32 that are joined unitarily for rotation by hinges 33. The accommodating portion 22 has upper and lower walls 25 and 26 that extend substantially at right angles from upper and lower edges of a left side wall 24. A right side surface of the accommodating portion 22 is substantially entirely open, and thereby forms an opening 27 open to the outside. The battery terminal 10 can be moved in a transverse direction normal to its longitudinal direction through the opening 27 and into the accommodating portion 22.

A partitioning wall 28 is formed between front ends of the upper and lower walls 25 and 26, and is substantially continuous with the left side wall 24. A horizontal slit 29 is open to the right near the upper end of the partitioning wall 28 to allow passage of the coupling portion 13 of the battery terminal 10. An inner space of the accommodating portion 22 behind the partitioning wall 28 defines an accommodation space 30 for at least partly accommodating the wire connector 14. Further, front and rear locks 31F, 31R are formed at the right edge of the inner surface of the upper wall 25.

Figure 3:
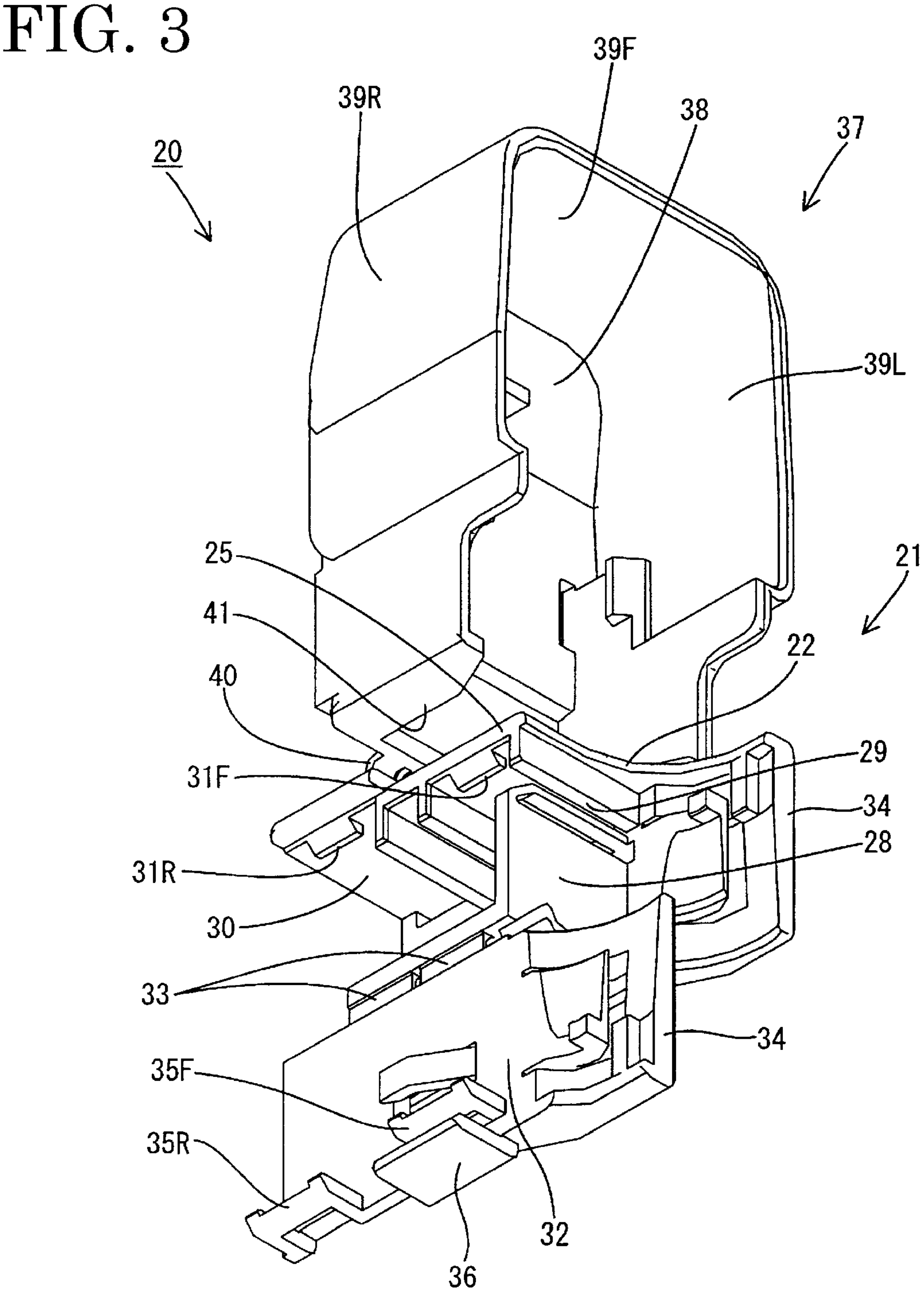
FIG. 3 is a perspective view of the protection cover with a lid portion in its opening position and a covering portion in its exposing position.
Figure 4:
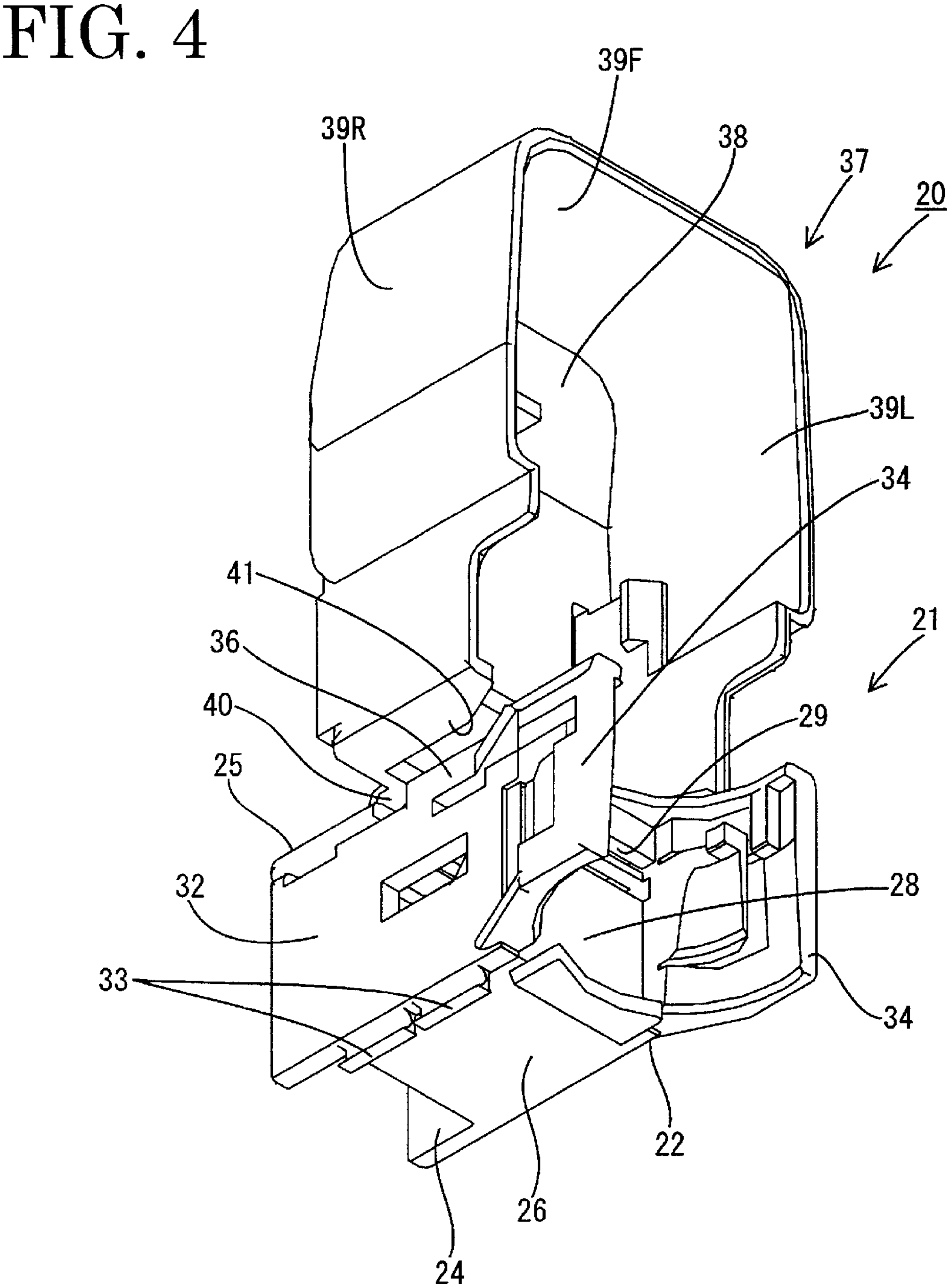
FIG. 4 is a perspective view of the protection cover with the lid portion in its closing position and the covering portion in its exposing position.
Figure 5:
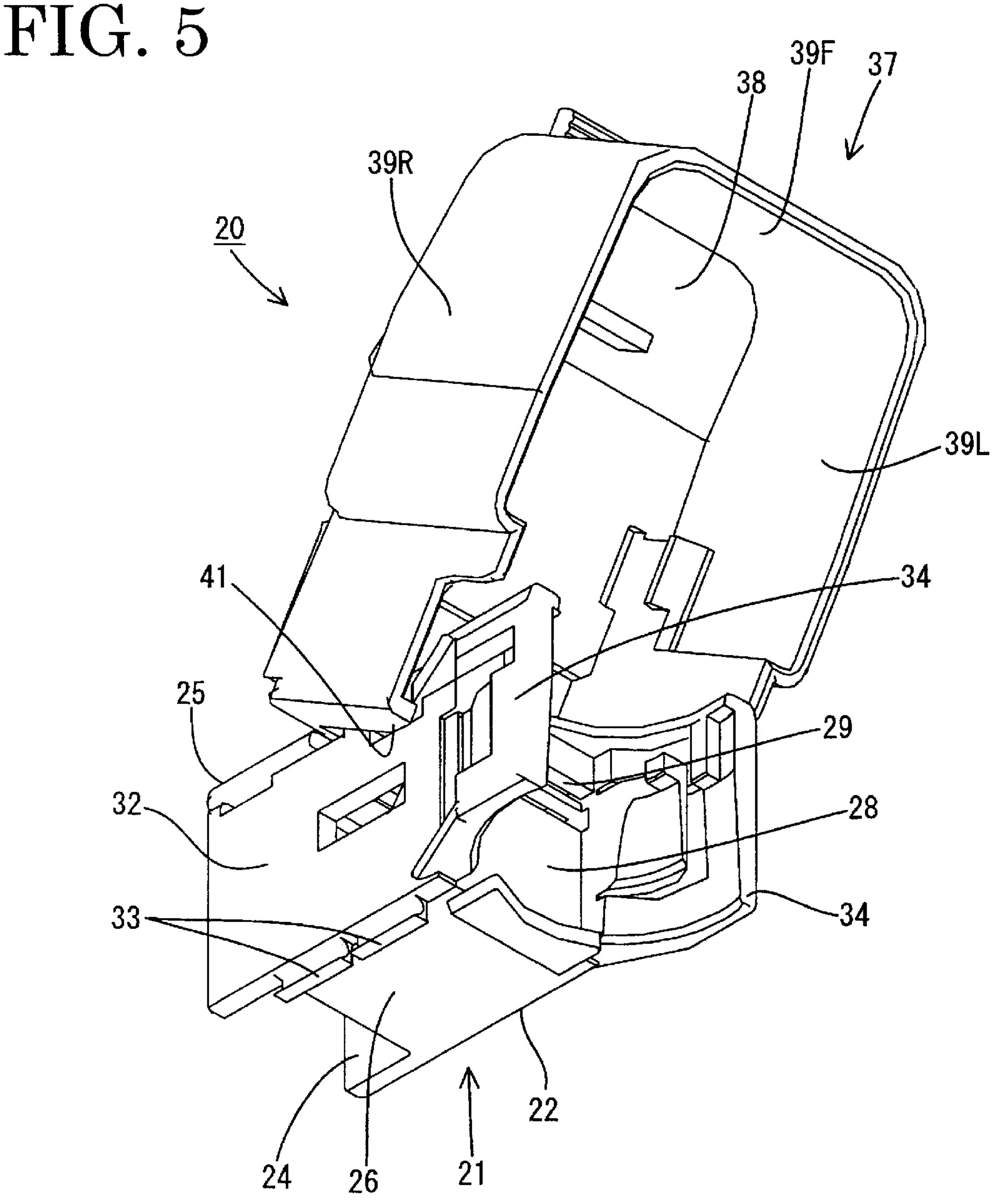
FIG. 5 is a perceptive view showing a state of the protection cover at an intermediate stage of rotation of the covering portion from the exposing position to a protecting position.
Figure 6:
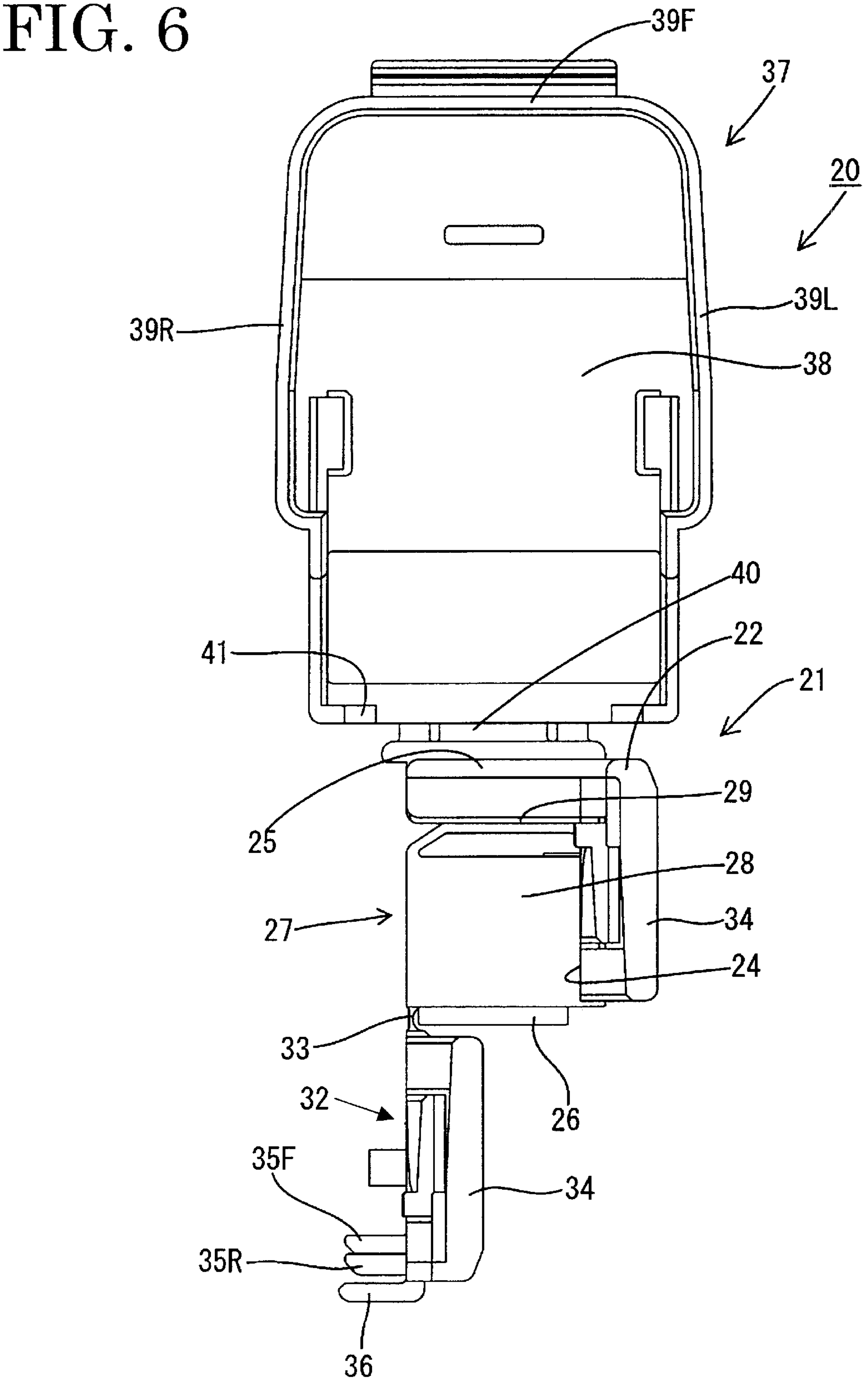
FIG. 6 is a front view of the protection cover with the lid portion in its opening position and the covering portion in its exposing position.
Figure 7:
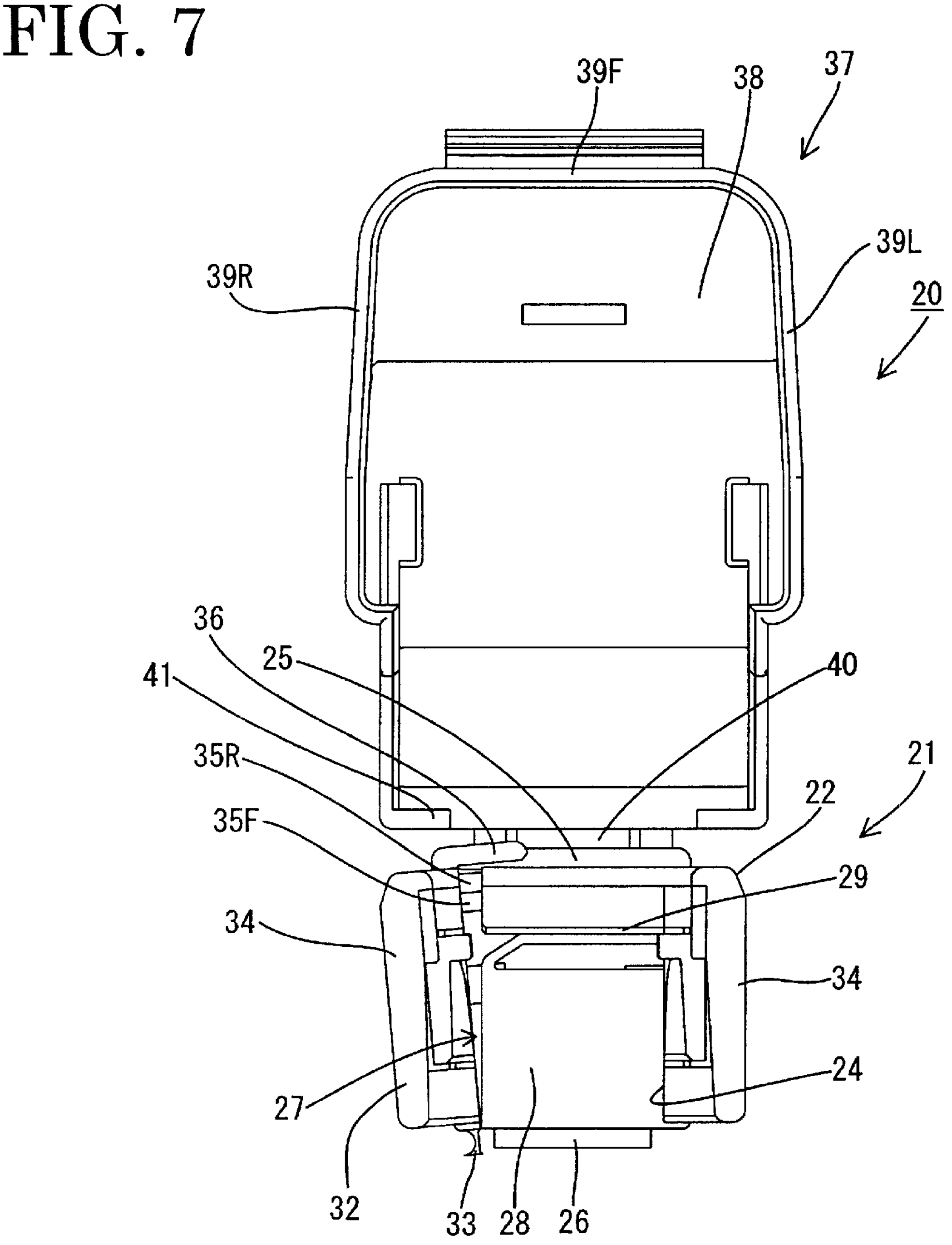
FIG. 7 is a front view of the protection cover when the lid portion is improperly mounted.

The lid 32 is substantially plate-shaped and is coupled to the accommodating portion 22 via the hinges 33 arranged one after the other along the right edge of the bottom wall 26 of the accommodating portion 22. Thus, the lid 32 can be rotated about the front and rear hinges 33 along a plane normal to forward and backward directions. The lid 32 can be rotated to a closed position (see FIGS. 1, 4, 5 and 8) where the lid 32 closes the opening 27 along the right side of the accommodating portion 22 to form the right side wall of the surrounding portion 21. The lid 32 also can be rotated approximately 180° from the closed position to an open position (see FIGS. 3, 6 and 9) where the lid 32 extends down from the accommodating portion 22. The orientation, position and shape of the lid 32 in its closed position are transversely symmetrical with the left side wall 24 of the accommodating portion 22. Further, the front end of the left side wall 24 of the accommodating portion 22 and the front end of the lid 32 define transversely symmetrical arcuate holding portions 34. A rear part of the clamp 11 can be brought into contact with the holding portions 34 to restrict a loose movement of the clamp 11.

Front and rear locks 35F, 35R are formed at an end of the lid 32 opposite its center of rotation for engagement with the locks 31F and 32R of the accommodating portion 22. More particularly, the locks 35F and 35R are at the upper end in the closed position of the lid 32 and the bottom end in the open position of the lid 32. The locks 35F, 35R and the locks 31F, 31R are configured to engage and locking the lid 32 in the closed position.

The lid 32 has an interfering portion 36 that substantially aligns longitudinally with the front lock 35F. The interfering portion 36 projects inwardly from the end of the lid 32 opposite the hinges 33 and toward the left side wall 24 of the accommodating portion 22 when the lid 32 is in closed. The interfering portion 36 extends along the upper outer and surface of the upper wall 25 when the lid 32 is in the closed position. At this time, the front locking piece 35F extends along the inner surface of the upper wall 25, and the right end of the upper wall 25 is held between the front locking piece 35F and the interfering portion 36 from below and above.

Figure 9:
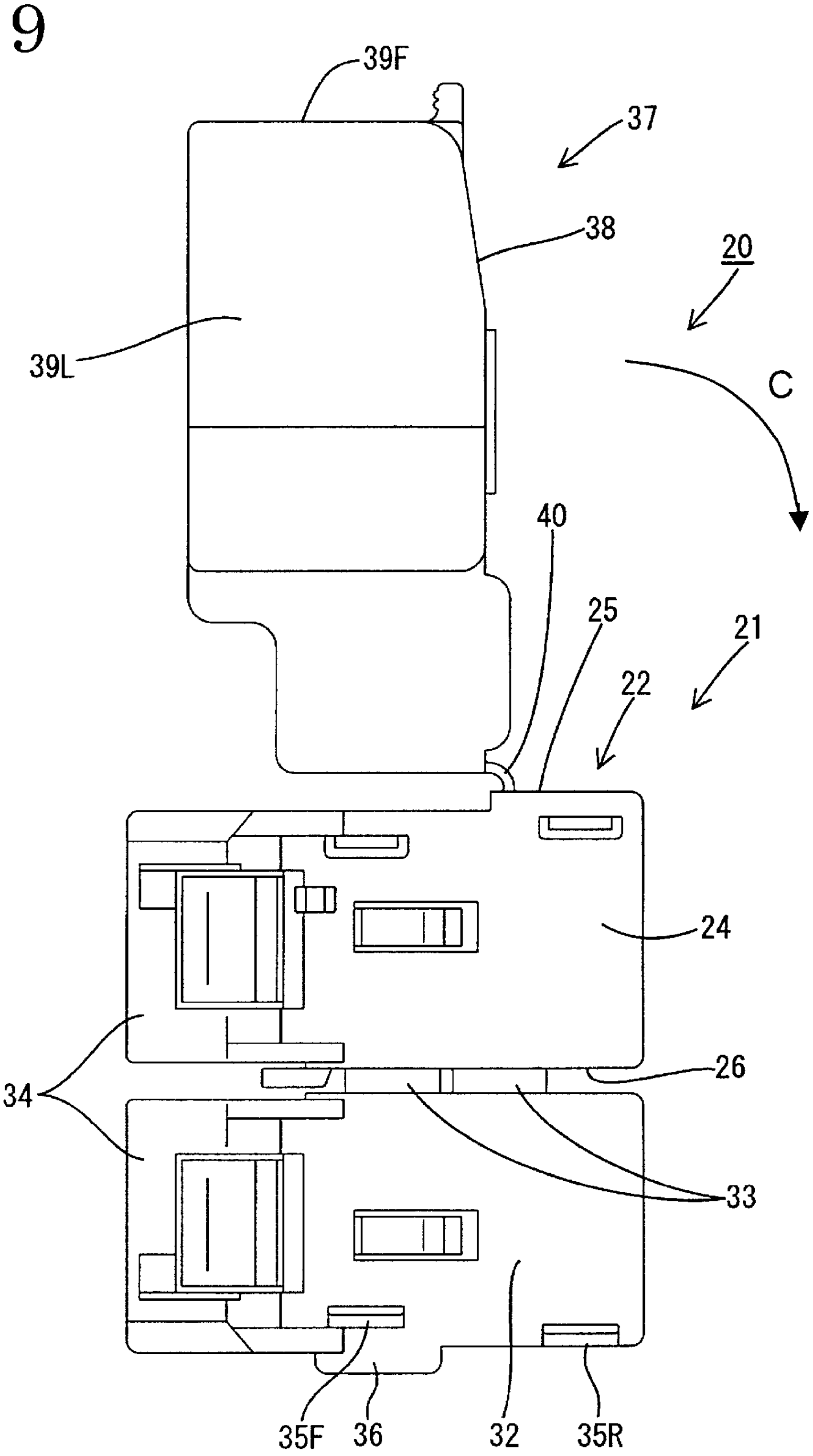
FIG. 9 is a left side view of the protection cover with the lid portion in its opening position and the covering portion in its exposing position.
Figure 10:
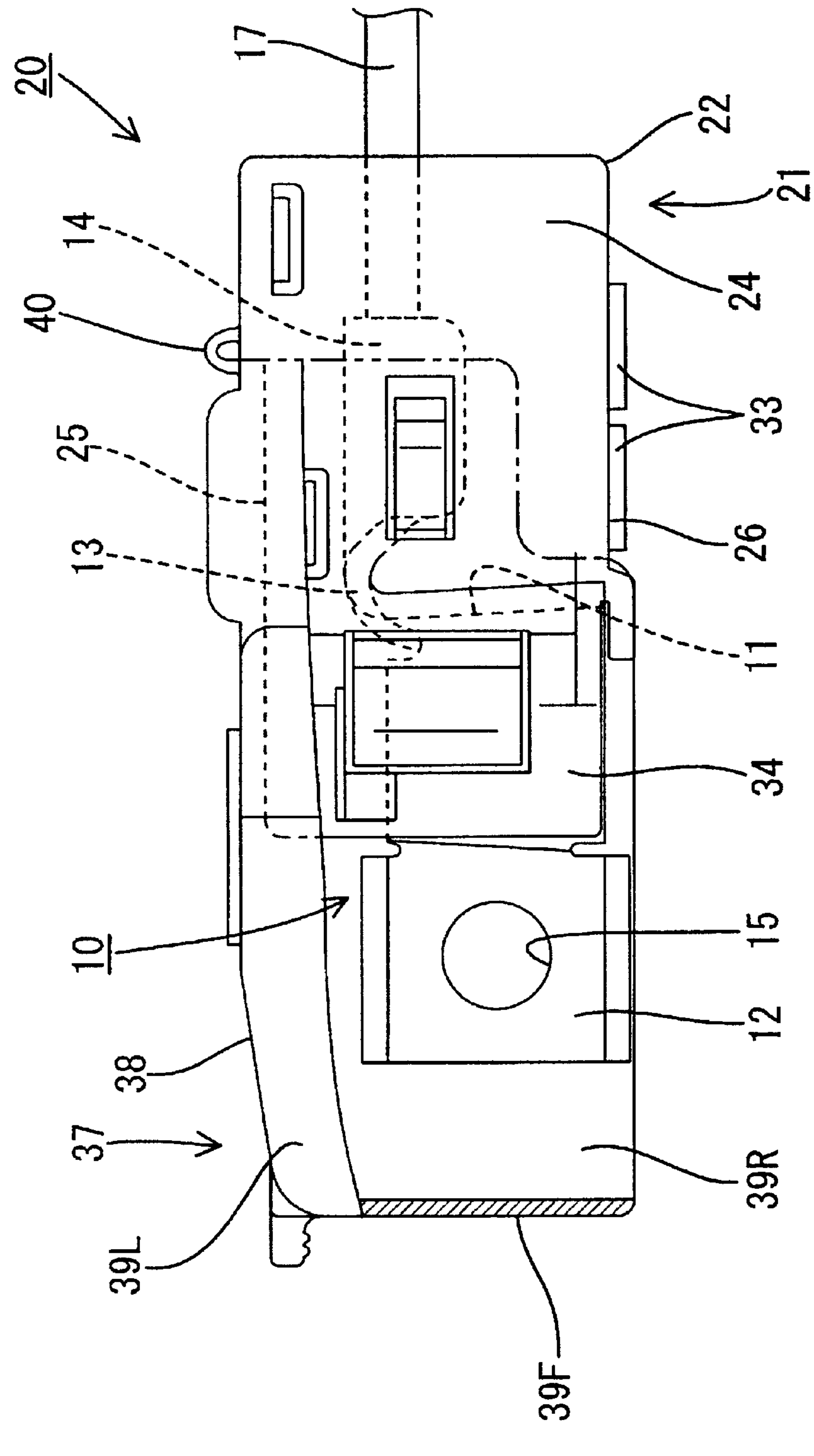
FIG. 10 is a side view partly in section showing a state where the protection cover is mounted on the battery terminal.

The cover 37 is substantially in the form of a box with a top wall 38 and an open bottom. A front wall 39F and left and right side walls 39L, 39R extend from the front, left and right edges of the top wall 38 at substantially right angles. The cover 37 is coupled rotatably to the accommodating portion 22 by a hinge 40. The hinge 40 is formed on the upper or outer surface of the upper wall 38 and extends in a direction normal to the hinges 33 of the lid 32 and normal to the longitudinal direction of the battery post 16. The cover 37 is rotatable about the hinge 40 between an exposing position (see FIGS. 3, 4, 6, 7, 8 and 9) where the cover 37 substantially exposes the clamp 11 and a protecting position (see FIGS. 1 and 10) where the cover 37 substantially covers the clamp 11. The hinge 40 is behind the interfering portion 36 of the lid 32 with respect to forward and backward directions. Further, the direction of rotation of the cover 37 is substantially parallel to the right side wall 39R of the cover 37. Thus, the axis of rotation is substantially normal to the plane of the right side wall 39R.

The upper wall 38 of the cover 37 extends up substantially at a right angle to the upper wall 25 of the accommodating portion 22, and the rear edges of the left and right side walls 39L, 39R are slightly higher than the upper wall 25 of the accommodating portion 22 when the cover 37 is in the exposing position. The cover 37 then can be rotated forward approximately 90° from the exposing position to the protecting position so that the upper, front and left and right side walls 38, 39F, 39L, 39R are at the upper, front, left and right sides of the clamp 11, respectively. As a result, the clamp 11 is substantially covered except the lower surface that corresponds to or mates with the upper surface of a battery (not shown). The left and right side walls 39L, 39R of the cover 37 substantially face the left side wall 24 of the accommodating portion 22 and the outer surface of the lid 32 when the cover 21 is in the protecting position.

Figure 8:
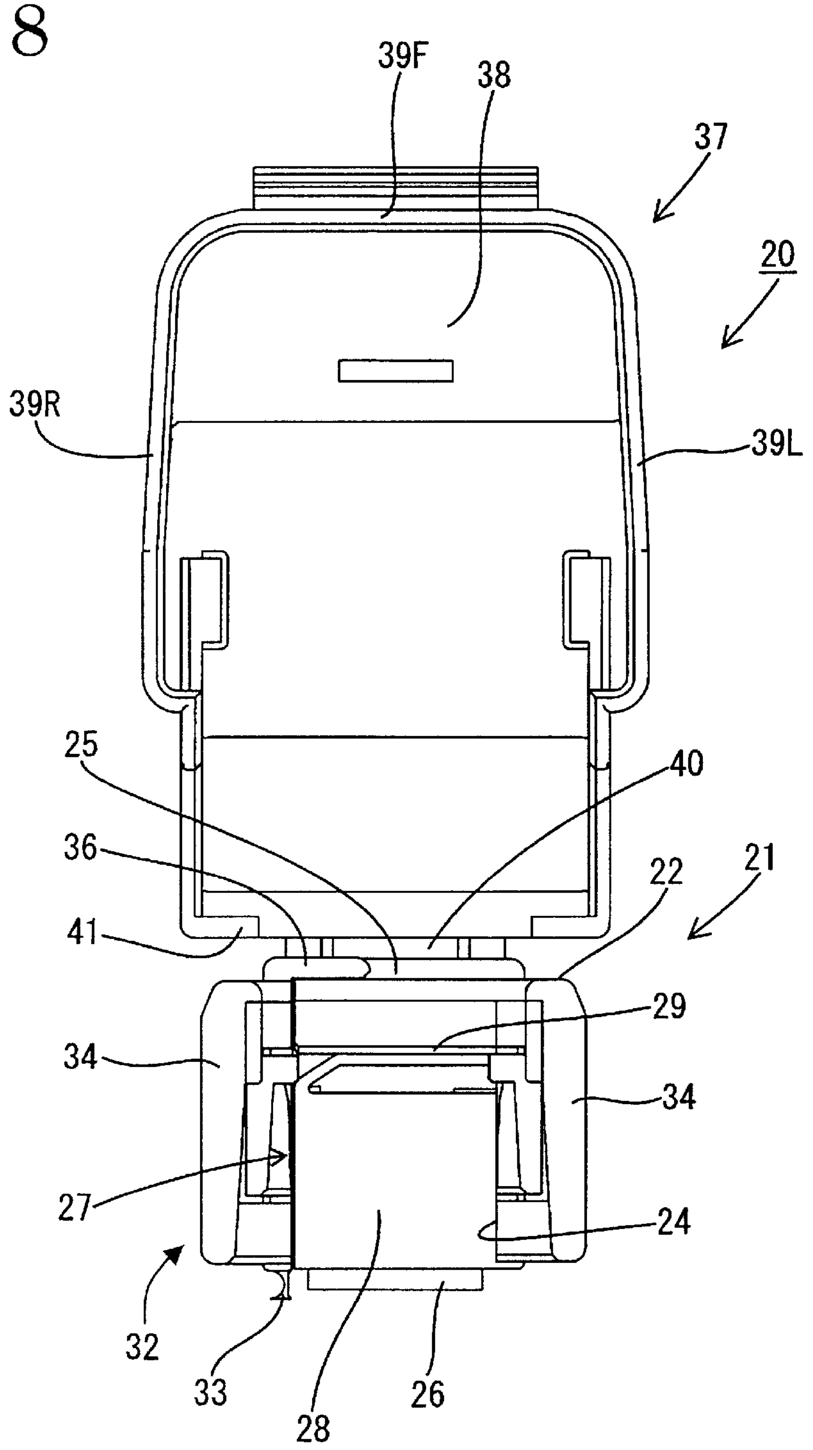
FIG. 8 is a front view of the protection cover when the lid portion is properly mounted.

The cover 37 is formed with an interfering portion 41 for cooperating with the interfering portion 36 of the lid 32 to detect improper mounting of the lid 32. The interfering portion 41 projects inwardly from the rear edge of the left side wall 39R to face the lid 32 in the closing position. The interfering portion 41 of the cover 37 is slightly above and slightly outward of the interfering portion 36 of the lid 32, as shown in FIG. 8, while the lid 32 is properly mounted and located in the proper closing position and while the cover 37 waits on standby in the exposing position.

The rotation path of the right side wall 39R and the interfering portion 41 of the covering 37 is substantially parallel to the right side wall 39R and parallel to a plane that includes forward and backward directions and vertical direction. Additionally, the rotation path of the lid 32 is preferably a semicircle that extends in a circumferential direction normal to the wall surfaces of the lid 32. Accordingly, the lid 32 is rotated to substantially transversely cross the rotation path of the right side wall 39R and the interfering portion 41 of the lid 32. At a final stage of the rotation of the lid 32 from the opening position to the closing position, the lid 32 is rotated to cross the rotation path (arrow C in FIG. 9) of the right side wall 39R and the interfering portion 41 of the cover 37 from an outer side (exposing position of the cover 37 where the lid 32 can be closed) to an inner side (closing position of the cover 37 where the lid 32 can no longer be closed due to interference with the cover 37) and reaches the closing position. If the lid 32 stops its rotation immediately before its proper closing position, i.e. ends up in the improperly mounted state, the interfering portion 36 of the lid 32 is on the rotation path of the right side wall 39R and the interfering portion 41 of the cover 37.

The protection cover 20 is mounted on the battery terminal 10 by first locating the cover 37 in its exposing position and locating the lid 32 in the opening position. The wire connector 14 of the battery terminal 10 then is accommodated into the accommodating portion 22 and the rear half of the clamp 11 is engaged with the holding portions 34. Subsequently, the lid 32 is rotated from the opening position to the closing position and is locked there by engagement of the locking pieces 35F, 35R and the locking projections 31F, 31R to form the surrounding portion 21 in the form of a rectangular tube. The wire connector 14 is surrounded over its entire circumference by the surrounding portion 21. At this stage, the clamp 11 is exposed forward of the accommodating portion 22. Thereafter, the cover 37 is rotated forward to the protecting position to cover the clamp 11. In this way, the protection cover 20 is completely mounted on the battery terminal 10.

If the lid 32 is mounted properly when the cove 37 is rotated to the protecting position, the two interfering portions 36, 41 do not interfere with each other since the interfering portion 36 of the lid 32 is inward of the rotation path of the right side wall 39R and the interfering portion 41 of the cover 37 with respect to widthwise direction. On the other hand, if the lid 32 does not reach the proper closing position due to incomplete mounting of the lid 32 (see FIG. 7), the two interfering portions 36, 41 contact each other immediately after the rotation of the cover 37 from the exposing position to the protecting position is started because the interfering portion 36 of the lid 32 is located on the rotation path of the right side wall 39R and the interfering portion 41 of the cover 37. Accordingly, any further rotation of the cover 37 is restricted. In this way, the mounted state of the lid 32 on the accommodating portion 22 can be detected based on whether the cover 37 can be rotated from the exposing position to the protecting position.

As described above, the interfering portion 36 of the lid 32 and the interfering portion 41 of the cover 37 do not interfere with each other while the cover 37 is being displaced from the exposing position to the protecting position if the lid 32 is mounted properly in the closing position with respect to the accommodating portion 22. However, the interfering portions 36 and 41 do interfere with each other if the lid 32 is mounted improperly, and hence the cover 37 cannot reach the proper closing position when the lid 32 is mounted improperly. Thus, whether the lid 32 is mounted properly on the accommodating portion 22 can be detected based on whether the interfering portions 36, 41 interfere with each other while the covering 37 is being displaced to the protecting position.

The right side wall 39R of the cover 37 is outside the lid 32 and the interfering portion 41 of the cover 37 substantially contacts and/or faces the outer side surface of the lid 32 when the lid 32 is in the proper closing position and the cover 37 is in the protecting position. Thus, the lid 32 in the closing position is prevented from rotating to the opening position by the interfering portion 41 of the cover 37.

The interfering portion 41 of the cover 37 in the exposing position and the interfering portion 36 of the lid 32 in the closed position are proximate to each other. Therefore, the interfering portions 36, 41 interfere with each other immediately after the displacement of the cover 37 is started if the lid 32 is improperly mounted when the cover 37 is displaced from the exposing position toward the protecting position. Thus, the cover 37 need not be rotated greatly.

The lid 32 is supported rotatably on the accommodating portion 22, and the interfering portion 36 is provided at the end of the lid 32 opposite from its center of rotation. Accordingly, the amount of shift of the interfering portion 36 in the direction crossing the rotation path of the right side wall 39R and the interfering portion 41 of the covering portion 37 between the improperly mounted state and the properly mounted state is larger. Thus, the interfering portion 36 of the lid 32 can be brought securely into contact with the interfering portion 41 of the cover 37 when the lid 32 is mounted improperly.

The present invention is not limited to the above described and illustrated embodiment. For example, the following embodiments are also embraced by the technical scope of the present invention as defined in the claims. Beside the following embodiments, various changes can be made without departing the sprit of the present invention as defined in the claims.

The accommodating portion and the lid are made integral or unitary to each other via the hinges in the foregoing embodiment. However the accommodating portion and the lid may be made as separate parts according to the present invention.

The cover is made integral or unitary to the surrounding portion via the hinge in the foregoing embodiment. However, the covering portion and the surrounding portion may be assembled from separate parts according to the present invention.

The interfering portion of the cover contacts the interfering portion of the lid to restrict any further rotation of the cover when the lid is mounted improperly. However, according to the present invention, the lid and the cover may be provided respectively with position correcting portions that engage with each other during the displacement of the cover to the protecting position to forcibly push the improperly mounted lid to the proper closing position.

The cover is supported on the accommodating portion via the hinge in the foregoing embodiment. However, the cover may be supported slidably on the accommodating portion according to the present invention.

What is claimed is:

1. A protection cover to be mounted on a battery terminal, the battery terminal having a clamp for connection with a battery post and a wire connector for connection with a wire, comprising:

a surrounding portion for substantially surrounding the wire connector, the surrounding portion comprising an accommodating portion with an opening to at least partly accommodate the wire connector, and a lid which is displaceably mounted on the accommodating portion between an opened position where the lid substantially opens the opening, of the accommodating portion and a closed position where the lid substantially closes the opening; and a cover displaceable relative to the accommodating portion between an exposing position where the cover substantially exposes the clamp and a protecting position where the cover substantially covers at least upper and lateral sides the clamp;

wherein the lid and the cover each comprise at least one interfering portion, the interfering portions being disposed and configured to avoid interference with each other while the cover is being displaced from the exposing position to the protecting position when the lid is in the closed position, and wherein the interfering portions interfere with each other and prevent the cover from reaching the protecting position when the lid is not in the closed position.

2. A protection cover according to claim 1, wherein the wire connector has a longitudinal axis, and wherein the accommodating portion is configured for receiving the wire connector in a direction substantially normal to the longitudinal axis of the wire connector.

3. A protection cover according to claim 1, wherein the cover is supported on the accommodating portion for rotation parallel to a side wall thereof.

4. A protection cover according to claim 3, wherein the lid is supported rotatably on the accommodating portion and reaches the closed position by rotationally displacement to cross a rotation path of the side wall of the cover from the exposing position to protecting position thereof.

5. A protection cover according to claim 1, wherein the interfering portion of the cover in the exposing position and the interfering portion of the lid in the closed position are adjacent each other.

6. A protection cover according to claim 1, wherein the lid is rotatably supported on the accommodating portion and the interfering portion is at an end of the lid opposite from a center of rotation.

7. A protection cover according to claim 1, wherein the lid and the cover each are provided with position correcting portions which are engageable with each other during the displacement of the cover to the protecting position to forcibly push an improperly mounted lid to the proper closing position.

8. A protection cover to be mounted on a battery terminal, the battery terminal having a clamp for connection with a battery post and a wire connector for connection with a wire, comprising:

an accommodating portion for accommodating the wire connector, the accommodating portion comprising an opening extending along one longitudinal side of the accommodating portion and being sufficiently large for insertion of the wire connector;

a lid hingedly mounted on the accommodating portion adjacent the opening, the lid being rotatable about a lid axis between an opened position where the lid is spaced sufficiently from the opening for insertion of the wire connector into the accommodating portion and a closed position where the lid substantially closes the opening;

a cover for accommodating the clamp and the battery post, the cover being hingedly mounted to the accommodating portion for rotation about a cover axis that is substantially normal to the lid axis, the cover being rotatable between an exposing position where the cover substantially exposes the clamp and a protecting position where the cover substantially covers the clamp; and interfering portions formed on both the cover and the lid, the interfering portions being disposed and configured to avoid interference with each other while the cover is being rotated from the exposing position to the protecting position and when the lid is in the closed position, and wherein the interfering portions are disposed and configured to interfere with each other and prevent the cover from reaching the protecting position when the lid is not in the closed position.

9. The protection cover of claim 8, wherein the interfering portion of the lid is at a location on the lid opposite the hinged connection of the lid to the accommodating portion.

10. The protection cover of claim 8 wherein the lid is unitary with the accommodating portion.

11. The protection cover of claim 10, wherein the cover is unitary with the accommodating portion.

12. The protection cover of claim 11, wherein the accommodating portion has opposite front and rear ends, the cover being hingedly connected to the front end of the accommodating portion, the interfering portion of the lid being disposed to engage a portion of the accommodating portion adjacent the front end when the lid is in the protecting position.

13. The protection cover of claim 12, wherein the cover includes a top wall hingedly connected to the accommodating portion, the cover further comprising left and right side walls, the right side wall being adjacent the lid when the lid is in the protecting position and when the cover is in the closed position, the interfering portion of the cover being on the right side wall in proximity to the hinged connection of the cover to the accommodating portion.

14. The protection cover of claim 11, wherein the accommodating portion, the lid and the cover are formed from a resin material.

* * * * *